Dec. 21, 1954  R. W. VERGOBBI  2,697,507
APPARATUS FOR STACKING AND CONVEYING PACKAGES
Filed Nov. 30, 1951  3 Sheets-Sheet 1

INVENTOR.
Robert W. Vergobbi
BY
J. Stanley Churchill.
ATTORNEY

Dec. 21, 1954     R. W. VERGOBBI     2,697,507
APPARATUS FOR STACKING AND CONVEYING PACKAGES
Filed Nov. 30, 1951     3 Sheets-Sheet 2

INVENTOR.
Robert W. Vergobbi
BY J. Stanley Churchill.
ATTORNEY

Dec. 21, 1954   R. W. VERGOBBI   2,697,507
APPARATUS FOR STACKING AND CONVEYING PACKAGES
Filed Nov. 30, 1951   3 Sheets-Sheet 3

INVENTOR.
Robert W. Vergobbi
BY
J. Stanley Churchill
ATTORNEY

United States Patent Office 2,697,507
Patented Dec. 21, 1954

2,697,507

APPARATUS FOR STACKING AND CONVEYING PACKAGES

Robert W. Vergobbi, Quincy, Mass., assignor to Pneumatic Scale Corporation, Limited, Quincy, Mass., a corporation of Massachusetts Application November 30, 1951, Serial No. 259,058

9 Claims. (Cl. 198—35)

This invention relates to apparatus for stacking and conveying packages, such as infusion packages or bags of the envelope or pillow type.

The invention has for an object to provide novel and improved apparatus for stacking and conveying packages of the character specified in which novel provision is made for forming and conveying a plurality of successive vertical stacks with the packages arranged horizontally and in groups of predetermined numbers whereby successive groups may be conveniently withdrawn from the apparatus to be packed into containers in which they are to be shipped and marketed.

With this general object in view, and such others as may hereinafter appear, the invention consists in the apparatus for stacking and conveying packages, and in the various structures, arrangements, and combinations of parts herein described and particularly defined in the claims at the end of this specification.

Figure 1:
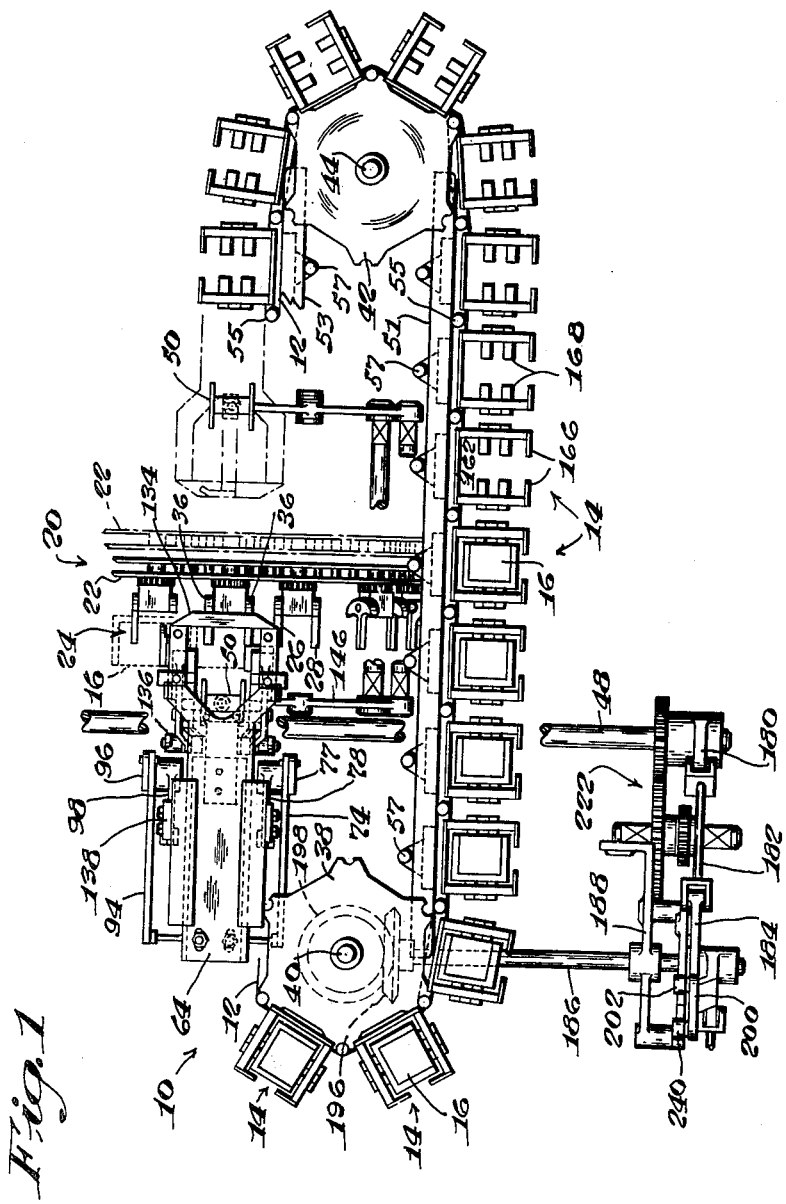
Figure 2:
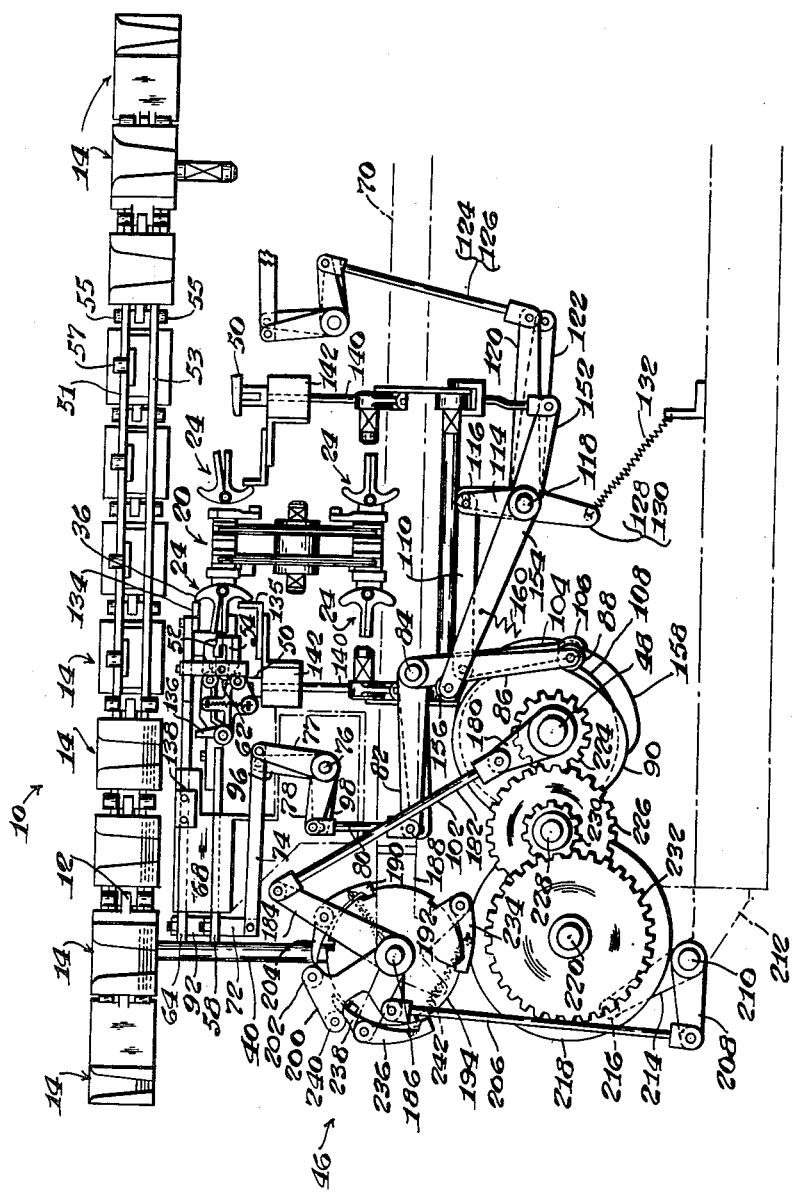
Figure 3:
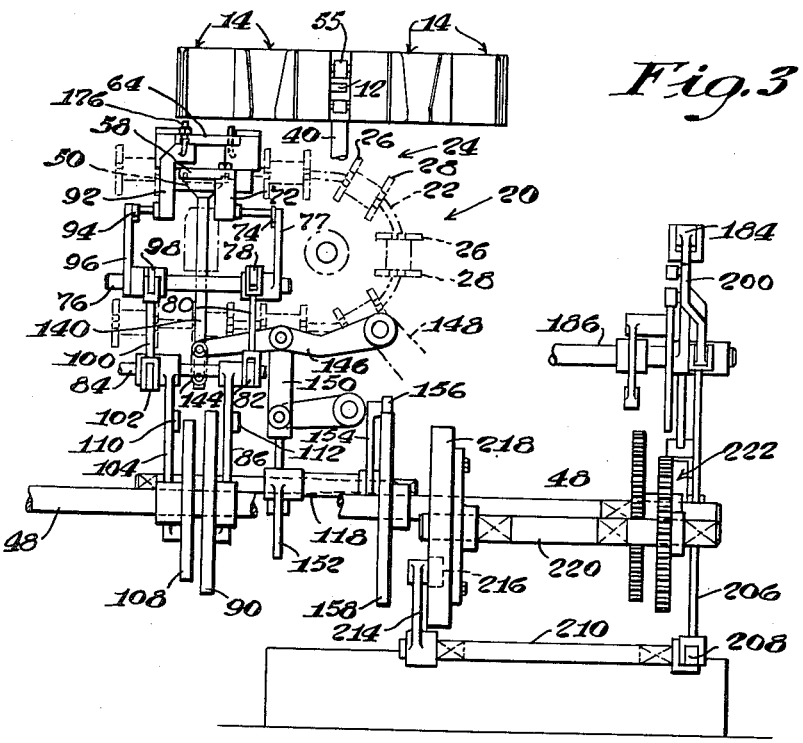
Figure 4:
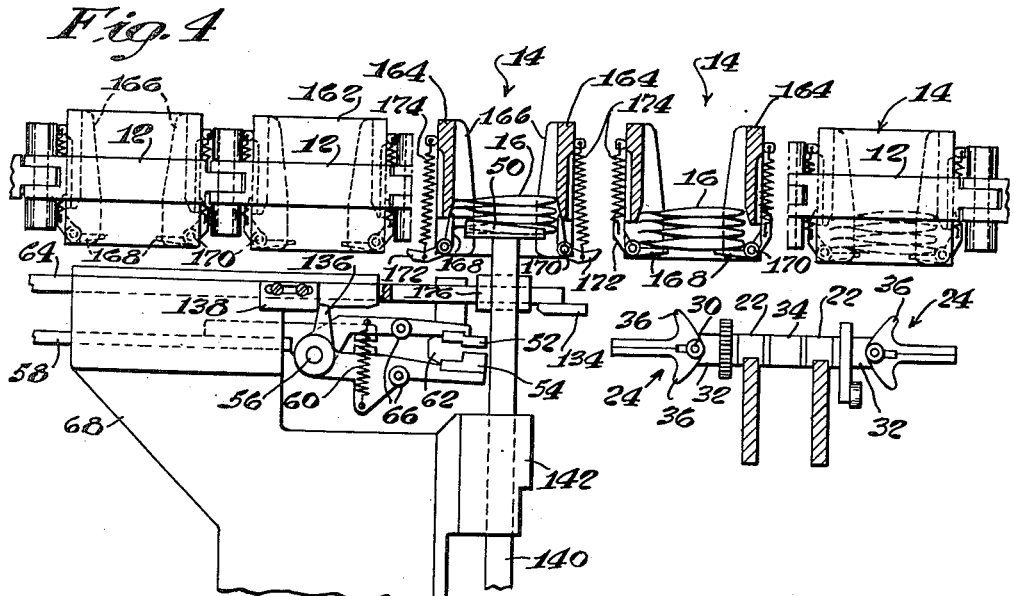

In the drawings illustrating the preferred embodiment of the invention, Fig. 1 is a plan view of the present stacking and conveying apparatus as embodied in a machine for forming packages; Fig. 2 is a front elevation of the same; Fig. 3 is an end view of the present apparatus; and Fig. 4 is a detail view of a portion of the apparatus shown in Fig. 2 with the operating parts shown in a different position of operation.

In general, the present invention contemplates apparatus for automatically stacking and conveying flat, rectangular packages, such as infusion bags of the envelope or pillow type, and in which novel provision is made for receiving the bags as they are produced and delivered to the present apparatus and for transferring the same into successive vertical pockets carried by an endless conveyor, the pockets being open at top and bottom whereby to form vertical stacks with the flat bags arranged horizontally and in groups of predetermined numbers to permit the packer to conveniently withdraw successive groups as they are conveyed by the apparatus and insert them into containers in which they are sold.

The present apparatus is particularly adapted to stack and convey infusion packages or flat, rectangular paper tea bags of the envelope or pillow type, such as is produced in a machine of the type illustrated and described in the United States Patent No. 2,385,229 to William S. Patterson, and is herein shown as embodied in a machine in which such bags are provided with a handle comprising a tag and a length of twine connecting it and the bag as the bags are produced, such tagging machine being illustrated and described in the United States Patent No. 2,457,216 to L. B. Eaton and R. W. Vergobbi. Provision is made in such tagging machines for gripping and conveying successive bags as they are formed and applying a handle thereto wherein the twine is wrapped about the bag so as to detachably secure the handle in proximity to the bag whereby to offer minimum liability of entanglement with other similar bags when packed in a container. In accordance with the present invention, successive bags thus conveyed by the tagging machine are grasped and removed therefrom by transfer mechanism arranged to transfer successive bags into operative relation to elevating mechanism adapted to elevate the bags into a pocket through the bottom thereof to form a vertical stack or group thereof with the bags arranged horizontally one above the other, each pocket being provided with an equal number of bags whereby such groups may be conveniently removed by the operator through the open tops of the pockets for packing into a container.

The present apparatus is illustrated herein as embodied in a duplex type of bag-forming and tagging machine, illustrated in Patent No. 2,457,216 above referred to, having provision for forming and conveying two lines of bags simultaneously, and the present apparatus is likewise arranged in duplex form to receive each of the two lines of bags transported thereto by the tagging machine during the operation of the apparatus. It will be understood that successive bags or other articles with or without handles may be presented to the present apparatus by other means whereby the bags or other articles may be transferred into operative position to be introduced into the stack-forming pockets in accordance with the present invention.

Referring now to the drawings, the present stacking and conveying apparatus, indicated generally at 10, comprises, in general, an endless horizontally arranged and intermittently movable conveyer chain 12 having a plurality of pockets 14 carried by and movable therewith. The pockets 14 are open at top and bottom, and provision is made for introducing successive bags presented thereto in a horizontal position into the pockets through the bottom thereof for a predetermined number of cycles, provision being made for retaining successive bags in the open pockets to form a vertical stack or group thereof of a predetermined number, and in practice, such groups are removed from the pockets through the open tops thereof by the operator during the operation of the apparatus and packed into containers to be shipped.

In the illustrated embodiment of the invention, the bags 16, which may comprise flat, rectangular infusion bags provided with handles wrapped thereabout, are illustrated as being presented to the present apparatus by tagging apparatus, indicated generally at 20, which may comprise the tagging apparatus shown in Patent No. 2,457,216 above referred to, only a part of which is herein illustrated. As herein shown, the tagging apparatus 20 includes an intermittently operated carrier chain 22 provided with a plurality of successive gripper units 24 carried by and movable with the chain, the bags being introduced into the grippers 24 from a tea-bag forming and filling machine as they are formed. The carrier chain 22 is provided with similar gripping units 24 extended laterally from both sides thereof for operation with a duplex tea-bagging machine, and in the following description, unless otherwise indicated, the mechanism for removing the bags from the gripper units and for transferring and introducing successive bags 16 into the pockets 14 will be described as applied to the bags disposed in one line of gripper units carried on one side of the chain, it being understood that duplicate and interconnected mechanisms are arranged to perform similar operations on a bag disposed in a gripper unit carried on the other side of the chain.

In general, each gripper unit 24 comprises two pairs of cooperating jaws 26, 28 which are pivotally mounted on a stud 30 fixed in and extended through a rectangular hub member 32 secured to a shaft journaled in a link member 34 forming a part of the carrier chain 22. Each pair of cooperating jaws 26, 28 may be yieldingly retained in their closed position, as by coil springs, and each jaw is provided with an angularly extended abutment 36 by which the jaws may be opened by pressure exerted thereagainst.

As herein shown, the stacking conveyor 10 is disposed above and arranged to run at right angles to the tagging-machine carrier chain 22, the conveyor chain 12 running over a driving sprocket 38 fast on a vertical shaft 40 disposed at one end of the apparatus, and an idler sprocket 42 rotatably supported on a stud 44 disposed at the other end of the apparatus. As shown in Figs. 2 and 3, the conveyor 10 is arranged to be intermittently driven in timed relation to the tagging apparatus through crank-operated indexing mechanism, indicated generally at 46, connected to and driven from a main cam shaft 48 forming a part of the tagging apparatus and corresponding to the cam shaft 404 shown in Patent No. 2,457,216 above referred to, as will be hereinafter described. In the operation of the machine a bag 16 supported horizontally in a gripper 24 is withdrawn therefrom and transferred laterally into a position immediately below a pocket 14 and above an elevator, indicated at 50, which is arranged to engage the bag and lift it into the pocket through the bottom thereof, provision being made for retaining the bag in the open pocket when the elevator is lowered. In practice, the indexing mechanism 46 may and preferably will be controlled to cause the conveyer pockets 14 to remain at rest for a predetermined number of cycles of operation of the gripper and transfer mechanisms so as to permit a predetermined number of bags to be transferred and stacked in each pocket, as will be hereinafter more fully described.

In order to support the pockets 14 vertically on the chain 12, upper and lower guide rails 51, 53 may be provided along the front and rear runs of the chain arranged to cooperate with rollers 55 carried by the chain and engageable with the outer faces of the guide rails, and rollers 57 carried by the pockets and engageable with the inner faces of the guide rails.

Referring now particularly to Fig. 4, successive bags 16 are withdrawn from successive grippers 24 by a pair of transfer jaws comprising an upper jaw 52 and a lower jaw 54 pivotally supported on a stud 56 carried by a horizontally reciprocal lower slide 58. The jaws 52, 54 are normally retained in their closed position by a spring 60 connecting the jaws, as shown, and the jaws are arranged to be opened by a cam piece 62 carried by and depending from a second or upper horizontally reciprocal slide member 64. The cam piece 62 carried by the upper slide is arranged to cooperate with rollers 66 carried by each of the transfer jaws 52, 54, as illustrated. The slides 58, 64 are supported for reciprocation in suitable guideways provided in a bracket 68 attached to the platen 70 of the machine frame, and are arranged to be reciprocated by cam-operated linkages from the main cam shaft 48. As herein shown, the outer end of the lower slide 58 is provided with a depending block 72 connected by a link 74 to one arm 77 of a bell crank pivotally mounted at 76. The second arm 78 of the bell crank is connected by a link 80 to one arm 82 of a second bell crank pivotally mounted at 84, the second arm 86 of the latter bell crank being provided with a roller 88 for cooperation with a cam 90 fast on the cam shaft 48. The second or upper slide 64 is also provided with a depending block member 92 connected by a link 94 to one arm 96 of a bell crank pivotally mounted at 76, the second arm 98 of which is connected by a link 100 to one arm 102 of a second bell crank pivotally mounted at 84. The second arm 104 of the latter bell crank is provided with a roller 106 for cooperation witth a cam 108 fast on the cam shaft 48. In order to operate the duplicate bag-withdrawing and transferring elements disposed on the opposite side of the gripper carrier chain 22 the cam arms 86, 104 are connected by links 110, 112 to arms 114, 116 respectively of three-armed levers pivotally mounted at 118, the second arms 120, 122 of which are connected by links 124, 126 respectively to their respective slide-operating linkages, as above described. The third arms 128, 130 of the three-armed levers may be connected by springs 132 for retaining the rollers 88, 106 in cooperative engagement with their respective cams 90 and 108. As illustrated in Fig. 2, the upper slide 64 also carries a cam piece 134 at its front end for cooperation with the abutments 36 of the carrier gripper jaws 24 to open the same slightly when the slide member is extended forwardly.

The transfer jaws 52, 54 are arranged in alignment with a gripper unit 24 on the intermittently movable carrier chain 22, and in operation, the transfer slide 58 and the cam slide 64 are extended forwardly to grasp and withdraw a bag from the gripper 24, the relative movement of the upper and lower slides being such as to effect opening of the transfer jaws 52, 54 about the bag 16 by the cam piece 62 as the slides are moved forwardly, and then opening of the gripper jaws 26, 28 by engagement of the cam piece 134 with the abutments 36, the forward movement of the cam piece 62 also permitting closing of the transfer jaws on the bag. A lower stationary cam piece 135 may be disposed to cooperate with the lower gripper jaw to maintain it in an open position, as shown. Thereafter, the slides 58, 64 are retracted to withdraw the bag from the gripper and to present the bag directly below a pocket 14 of the stacking conveyer and above the elevator 50 arranged to elevate the bag into the open bottom of the pocket.

As herein shown, the lower transfer jaw 54 is provided with an upstanding extension 136 arranged to cooperate with a stop member 138 adjustably secured to a portion of the slide-frame bracket 68 so as to effect rocking of the lower jaw 54 away from the upper jaw 52 as the slide 58 approaches the end of its retracting stroke whereby to release its grip on the bag and permit the elevator to push the bag upwardly out of the transfer jaws.

As shown in Fig. 2, the elevator 50 is mounted on a vertically reciprocal shaft 140 supported for reciprocation in a slide bearing 142 attached to the bracket 68 and is arranged to be reciprocated in timed relation to the operation of the transfer jaws 52, 54 through cam-operated linkage including a link 144 pivotally secured to the lower end of the shaft 140 and connected to an arm 146 pivotally mounted in a bracket 148 attached to the machine frame. The arm 146 is connected at an intermediate point by a link 150 to one arm 152 of a two-armed lever pivotally mounted at 118. The second arm 154 of the two-armed lever carries a cam roll 156 for cooperation with a cam 158 fast on the cam shaft 48. A spring 160 connected to the arm 154 is arranged to hold the roller against its cam 158. Similar elevating linkage actuated by the cam 158 may be disposed on the opposite side of the gripper carrier 22 for elevating the bags transferred into operative relation thereto by the simultaneously operated duplicate transfer mechanism cooperating with the second line of bags carried by the tagging apparatus 20.

As illustrated in detail in Fig. 4, each bag-stacking and conveying pocket 14 comprises a rear-wall member 162 secured to a link 12 of the conveyor chain, and outwardly extended side-wall members 164 attached to the rear wall. The front of the pocket is provided with inwardly extended side guides 166 secured to the side walls 164 leaving the center portion of the front of the pocket open to permit the operator to grasp a group of bags stacked therein and to remove the same through the open top thereof. The lower end of each pocket is provided with opposed inwardly extended retaining plates 168 supported in slotted openings in the side walls 164 and rockingly mounted on pins 170 carried by the side walls. Each retaining plate 168 is provided with an arm 172 connected by a spring 174 to a stud carried by its side wall 164, the arms 172 being also provided with bearing pads for engagement with their respective side walls so as to limit the rocking movement of the plates by the springs 174 and to dispose the plates in a normally horizontal position, as shown. As viewed in plan, each retaining plate 168 may be formed as providing projections extended into the path of a bag to be elevated into the pocket, and the head 50 of the elevator, as seen in plan, may be H-shaped so as to provide a clearance to avoid contact with the plates when the elevator is raised into the pocket. The elevator head may comprise an inverted U-shaped member, the legs of the U being tapered upwardly slightly in the direction of the travel of a bag being presented thereto, as viewed in side elevation. Opposed side guides 176 supported in the upper slide 64 are positioned above the elevator 50, between the elevator and a pocket 14 when the upper slide is in its fully retracted position for guiding and controlling the bag as it is elevated into the pocket. In practice, the side guides 176 may be spaced apart a distance slightly less than the width of a bag so that the adjacent edges of the bag will frictionally engage the guides as the bag passes therebetween.

With this construction it will be seen that, in operation, when the elevator is raised to push a bag out of the transfer jaws 52, 54, through the guides 176, and into the pocket 14, the edges of the bag engage with the inwardly extended and yieldingly mounted retaining plates 168 and rock the plates on their pivots to permit the bags to be elevated beyond the plates, and upon descent of the elevator, the bag may drop down in the pocket to be supported on top of the opposed retaining plates, and successive bags thus introduced through the bottom of the pocket will be similarly trapped or retained to form a stack or group thereof.

Referring now to Fig. 2, provision is made for introducing a plurality of and preferably a predetermined number of bags into a pocket when it comes to rest at a stacking station, and for this purpose the indexing mechanism 46 is arranged to be controlled to maintain the intermittently movable stacking conveyer 10 at rest for a predetermined number of cycles of the gripper carrier 22 and the transfer and elevating mechanisms until such predetermined number of bags has been introduced into a pocket disposed at such stacking station. As herein shown, the indexing mechanism 46 for intermittently driving the stacking conveyer 10 includes a crank 180 fast on the main cam shaft 48 and connected by a link 182 to a pawl arm 184 rockingly mounted on a shaft 186 journaled in suitable bearings in a bracket 188 attached to the machine frame. The arm 184 carries a driving pawl 190 arranged to cooperate with slots 192 formed in the periphery of an indexing wheel 194 fast on the shaft 186. The inner end of the shaft 186 is provided with a bevel gear 196 in mesh with a bevel gear 198 fast on the lower end of the vertical drive shaft 40 to which the sprocket 38 of the stacking conveyer is secured. In operation, each cycle of the crank 180 is adapted to move the conveyer 10 one station of operation. However, in order to control the movement of the conveyer 10 to permit successive pockets 14 to remain at the stacking station for more than one cycle of the transfer and elevating mechanisms so as to receive a plurality of bags, as described, a cam-operated pawl lifting arm 200 is also rockingly mounted on the shaft 186, the arm 200 being provided with a roller 202 arranged to engage the tail 204 of the driving pawl 190 to prevent it from dropping down into a slot 192 of the indexing wheel 194 during the counterclockwise or return stroke of the arm 184 so that during the driving or clockwise stroke of the arm 184 the pawl 190 merely rides over the periphery of the wheel 194 without effecting rotation thereof, this action being repeated for a predetermined number of cycles until the required number of bags is deposited into a pocket. Thereafter, the cam-operated pawl lifting arm 200 is retracted or rocked counterclockwise to permit driving of the conveyer 10 for one cycle of operation to move the pockets 14 one station.

As illustrated in Fig. 2, the pawl-lifting arm 200 is connected by a link 206 to an arm 208 fast on a rocker shaft 210 supported in a bracket 212 attached to the machine frame. A second arm 214 also fast on the shaft 210 is provided with a cam roll 216 for cooperation with a cam 218 fast on an auxiliary cam shaft 220. The cam shaft 220 is arranged to be driven at a reduced rate through a gear train 222 connected to the main cam shaft 48, the gear train being designed to rotate the shaft 220 once for a predetermined number of rotations of the cam shaft 48. For example, if it is desired to deposit four bags in each pocket, the gear train 222 may be designed to cause the cam shaft 220 to be rotated ¼ turn for each cycle of the cam shaft 48; if five bags are desired in each pocket, the shaft 220 may be rotated ⅕ turn for each cycle; and if six bags are desired, the shaft 220 may be rotated ⅙ turn for each revolution of the cam shaft 48, and so on. As herein shown, the gear train 222 may comprise a pinion 224 fast on the main cam shaft 48, in mesh with an idler gear 226 rotatably mounted on a stud 228. The idler 226 has a pinion 230 formed integrally therewith meshing with a gear 232 fast on the auxiliary cam shaft 220. The indexing mechanism 46 may be provided with a holding pawl 234 arranged to prevent reverse rotation of the indexing wheel 194, and a second holding pawl 236, arranged to prevent forward rotation of the wheel 194 during the idle cycles of operation, is provided with a tail 238 adapted to be engaged by a second roller 240 carried by the pawl-lifting arm 200 for lifting the pawl 236 out of engagement with the wheel 194 when the arm 200 is retracted to permit operation of the driving pawl 190. Each of the pawls is urged into engagement with a slot 192 by a spring 242 connected thereto.

From the description thus far, it will be observed that in the operation of the present apparatus, successive bags delivered to the stacking conveyer 10 by the tagging apparatus 20 are removed from the grippers 24, transferred to elevating position, and then elevated into a pocket 14 to be retained therein to form a group or stack thereof. In practice, the illustrated apparatus is adapted to receive and stack two lines of bags delivered thereto by the tagging apparatus. Thus, in operation, when the indexing mechanism 46 is arranged to cause four bags to be deposited in a pocket 14 at each of the two stations of operation, there will be a total of eight bags in each stack conveniently arranged for the operator to merely grasp a stack between the thumb and forefinger through the open front of the pocket, and withdraw the stack upwardly through the open top of the pocket to be directly placed in a container for shipping. When arranged as in the above example, the apparatus is particularly useful for packing containers holding bags in multiples of eight, such as 16 or 48, and when the bags or other articles are to be packed in containers holding multiples of 10 or 12, the gear train 222 may be changed accordingly to cause five or six bags respectively to be deposited into a pocket 14 at each of the two stacking stations.

In the illustrated embodiment of the invention wherein the bags are of the flat envelope type formed on the tea-bagging machine with one edge folded and the adjacent and opposing edges sealed, a plurality of such bags stacked with the folded edges on the same side one above the other will tend to form a stack higher on one side than the other. In the present apparatus the two lines of bags delivered by the tagging apparatus 20 are arranged with the folded edges extended inwardly from each side of the carrier 22. Thus, in operation, the bags elevated into a pocket at one station will have the folded edges on one side of the pocket while the bags elevated into the same pocket at the second station will have the folded edges on the other side of the pocket, thereby tending to equalize the stacks to produce groups of uniform heights.

The present stacking and conveying apparatus is of particular advantage in that the bags handled horizontally and elevated into the bottoms of the pockets tend to maintain the loose contents, such as tea, evenly distributed in the bags rather than settling the contents in the lower ends thereof as occurs when the bags are handled vertically, and in practice, the relatively large number of filled pockets passing in front of the operator facilitates inspection of the condition of the bags, the intermittent operation and idle time at each station while the bags are being deposited into the pockets providing ample time for the operator to remove the bags from the pockets through the top thereof.

While the preferred embodiment of the invention has been herein illustrated and described, it will be understood that the invention may be embodied in other forms within the scope of the following claims.

Having thus described the invention, what is claimed is:

1. In apparatus of the character described, in combination, bag-delivery means including a carrier provided with a plurality of bag-holding grippers, an endless conveyer having a plurality of vertically disposed hollow bag-receiving pockets open at top and bottom and provided with retaining means at the lower end thereof, means for withdrawing and transferring successive bags from said grippers to a position immediately beneath a pocket, and means for elevating a predetermined number of successive bags into successive pockets to form stacks thereof adapted to be withdrawn through the open tops of the pockets.

2. Apparatus as defined in claim 1 wherein the bags comprise flat, rectangular bags and are handled in a horizontal position with the bags arranged one below the other to form the vertical stacks.

3. In apparatus of the character described, in combination, bag-delivery means including an intermittently operated carrier provided with a plurality of bag-holding grippers, an intermittently operated stacking conveyer having a plurality of vertically disposed hollow bag-receiving pockets open at top and bottom and provided with retaining means at the lower end thereof, cyclically operated means for withdrawing and transferring successive bags from said grippers to a position immediately beneath a pocket, cyclically operated means for elevating successive bags into the open bottom of a pocket to form a stack thereof adapted to be withdrawn as a group through the open top of a pocket, and drive means for said intermittently operated stacking conveyer arranged to cause the same to remain at rest for a predetermined number of cycles of operation of said transferring and elevating means to provide a predetermined number of bags in each pocket.

4. In apparatus of the character described, in combination, bag-delivery means including an intermittently operated carrier provided with a plurality of bag-holding grippers, an intermittently operated stacking conveyer having a plurality of vertically disposed hollow bag-receiving pockets open at top and bottom and provided with retaining means at the lower end thereof, cyclically operated means for withdrawing and transferring successive bags from said grippers to a position immediately beneath a pocket, cyclically operated means for elevating successive bags into the open bottom of a pocket to form a stack thereof adapted to be withdrawn as a group through the open top of a pocket, and drive means for said intermittently operated stacking conveyer arranged to cause the same to remain at rest for a predetermined number of cycles of operation of said transferring and elevating means to provide a predetermined number of bags in each pocket, said drive means including an indexing mechanism, and control means cooperating therewith to render the indexing mechanism inoperative for a predetermined number of cycles of operation.

5. In apparatus of the character described, in combination, bag-delivery means including a carrier provided with a plurality of bag-holding grippers on opposed sides thereof forming two lines of bags, an intermittently operated stacking conveyer having a plurality of vertically disposed hollow bag-receiving pockets open at top and bottom and provided with bag-retaining means at the lower end thereof, means for withdrawing and transferring successive bags from the grippers in one of said lines to a position immediately beneath a pocket, means for elevating a predetermined number of bags into said pocket to form a partial stack thereof, and simultaneously operated duplicate withdrawing and elevating mechanisms cooperating with the second line of bags presented thereto by the carrier, said duplicate mechanisms subsequently depositing an equal number of bags into said pocket to complete the formation of the stack.

6. In apparatus of the character described, in combination, bag-delivery means including a carrier provided with a plurality of bag-holding grippers on opposed sides thereof forming two lines of bags, an intermittently operated stacking conveyer having a plurality of vertically disposed hollow bag-receiving pockets open at top and bottom and provided with bag-retaining means at the lower end thereof, means for withdrawing and transferring successive bags from the grippers in one of said lines to a position immediately beneath a pocket, means for elevating a predetermined number of bags into said pocket to form a partial stack thereof, and simultaneously operated duplicate withdrawing and elevating mechanisms cooperating with the second line of bags presented thereto by the carrier, said duplicate mechanisms subsequently depositing an equal number of bags into said pocket to complete the formation of the stack, and drive means for said intermittently operated conveyer arranged to cause the same to remain at rest for a predetermined number of cycles of operation of said transferring and elevating means to provide said predetermined number of bags at each bag-depositing station.

7. In apparatus of the character described, in combination, bag-delivery means including a carrier provided with a plurality of bag-holding grippers on opposed sides thereof forming two lines of bags, an intermittently operated stacking conveyer having a plurality of vertically disposed hollow bag-receiving pockets open at top and bottom and provided with bag-retaining means at the lower end thereof, means for withdrawing and transferring successive bags from the grippers in one of said lines to a position immediately beneath a pocket, means for elevating a predetermined number of bags into said pocket to form a partial stack thereof, and simultaneously operated duplicate withdrawing and elevating mechanisms cooperating with the second line of bags presented thereto by the carrier, said duplicate mechanisms subsequently depositing an equal number of bags into said pocket to complete the formation of the stack, said bags having one edge folded tending to cause one side of the stack to be higher than the other, the folded edges at one depositing station being opposed to the folded edges at the second depositing station to equalize said tendency and to form stacks of uniform height.

8. In apparatus of the character described, in combination, bag-delivery means including a carrier provided with a plurality of bag-holding grippers, an endless conveyer having a plurality of vertically disposed hollow bag-receiving pockets open at top and bottom and provided with retaining means at the lower end thereof, means for withdrawing and transferring successive bags from said grippers to a position immediately beneath a pocket, and means for elevating a predetermined number of successive bags into successive pockets to form stacks thereof adapted to be withdrawn through the open tops of the pockets, said transferring means comprising a pair of reciprocal jaws having spaced arms arranged to be closed upon a bag held in a gripper and to be retracted to withdraw the bag therefrom, means engageable with said jaws for opening the same when they arrive in their retracted position, said elevating means engaging the bag between said spaced arms to lift the bag out of the jaws and deposit it into the pocket.

9. In apparatus of the character described, in combination, bag-delivery means including an intermittently operated carrier provided with a plurality of bag-holding grippers, an intermittently operated stacking conveyer having a plurality of vertically disposed hollow bag-receiving pockets open at top and bottom and provided with retaining means at the lower end thereof, cyclically operated means for withdrawing and transferring successive bags from said grippers to a position immediately beneath a pocket, cyclically operated means for elevating successive bags into the open bottom of a pocket to form a stack thereof adapted to be withdrawn as a group through the open top of a pocket, and drive means for said intermittently operated stacking conveyor arranged to cause the same to remain at rest for a predetermined number of cycles of operation of said transferring and elevating means to provide a predetermined number of bags in each pocket, said drive means including an indexing mechanism, and control means cooperating therewith to render the indexing mechanism inoperative for a predetermined number of cycles of operation, and means for operating said control means including a train of gears interchangeably mounted for selectively varying the number of bags caused to be deposited into successive pockets.

References Cited in the file of this patent

UNITED STATES PATENTS

| Number | Name | Date |
| --- | --- | --- |
| 1,920,762 | Neff | Aug. 1, 1933 |
| 2,087,809 | Nichols | July 20, 1937 |
| 2,324,523 | Lund | July 20, 1943 |
| 2,556,214 | Pottle | June 12, 1951 |
| 2,594,346 | Preis | Apr. 29, 1952 |